(12) United States Patent
Chawla et al.

(10) Patent No.: US 10,891,427 B2
(45) Date of Patent: Jan. 12, 2021

(54) MACHINE LEARNING TECHNIQUES FOR GENERATING DOCUMENT SUMMARIES TARGETED TO AFFECTIVE TONE

(71) Applicant: Adobe Inc., San Jose, CA (US)

(72) Inventors: Kushal Chawla, Karnataka (IN); Balaji Vasan Srinivasan, Bangalore (IN); Niyati Himanshu Chhaya, Telangana (IN)

(73) Assignee: ADOBE INC., San Jose, CA (US)

( * ) Notice: Subject to any disclaimer, the term of this patent is extended or adjusted under 35 U.S.C. 154(b) by 77 days.

(21) Appl. No.: 16/270,191

(22) Filed: Feb. 7, 2019

(65) Prior Publication Data
US 2020/0257757 A1 Aug. 13, 2020

(51) Int. Cl.
*G06F 16/00* (2019.01)
*G06F 40/166* (2020.01)
*G06N 20/00* (2019.01)
*G06F 40/20* (2020.01)
*G06F 16/34* (2019.01)

(52) U.S. Cl.
CPC .......... *G06F 40/166* (2020.01); *G06F 16/345* (2019.01); *G06F 40/20* (2020.01); *G06N 20/00* (2019.01)

(58) Field of Classification Search
CPC .................................................. G06F 16/345
See application file for complete search history.

(56) References Cited

U.S. PATENT DOCUMENTS

| 10,409,898 B2 * | 9/2019 | Sharma ................ G06F 40/151 |
| 10,685,050 B2 * | 6/2020 | Krishna ............... G06F 16/313 |
| 2008/0306899 A1 * | 12/2008 | Gregory ................ G06F 16/345 |
| 2016/0098405 A1 * | 4/2016 | Gorbansky ....... G06F 16/24578 |
| | | 707/749 |
| 2019/0122145 A1 * | 4/2019 | Sun ........................ G06N 5/02 |
| 2020/0159863 A1 * | 5/2020 | Wang .................... G06F 16/353 |

OTHER PUBLICATIONS

Rentoumi et al., "Investigating Metaphorical Language in Sentiment Analysis: A Sense-to-Sentiment Perspective" ACM Transactions on Speech and Language Processing, vol. 9, No. 3, Article 6, Publication date: Nov. 2012, 31 pages (Year: 2012).*
Li et al., "Predicting Social Emotions from Readers' Perspective," IEEE Transactions on Affective Computing, vol. 10, No. 2, Apr.-Jun. 2019, p. 255-264, first published Apr. 2017. (Year: 2017).*

(Continued)

*Primary Examiner* — Amelia L Tapp
(74) *Attorney, Agent, or Firm* — Kilpatrick Townsend & Stockton LLP (57) ABSTRACT

An affective summarization system provides affective text summaries directed towards affective preferences of a user, such as psychological or linguistic preferences. The affective summarization system includes a summarization neural network and an affect predictor neural network. The affect predictor neural network is trained to provide a target affect level based on a word sequence, such as a word sequence for an article or other text document. The summarization neural network is trained to provide a summary sequence based on the target affect level and on the word sequence for the text document.

20 Claims, 7 Drawing Sheets

(56) References Cited

OTHER PUBLICATIONS

Chhaya, et al., "Frustrated, Polite or Formal: Quantifying Feelings and Tone in Emails", 2018, 76-86.
Ghosh, et al., "Affect-LM: A Neural Language Model for Customizable Affective Text Generation", Institute for Technoligies, University of Southern California, CA, Apr. 22, 2017, 9 pages.
Hochreiter, et al., "Long Short-Term Memory", Neural Computation 9(8), 1997, 1735-1780.
Nallapati, et al., "Abstractive Text Summarization using Sequence-to-Sequence RNNs and Beyond", Proceedings the 20th SIGNLL Conference on Computational Natural Language Learning, August Jul. 12, 2016, 280-290.
Pavlick, et al., "An Empirical Analysis of Formality in Online Communication", Transactions of the Association for Computational Linguistics, vol. 4, 2016, 61-74.
Preotiuc-Pietro, et al., "Personality Driven Differences in Paraphrase Preference", Proceedings of the Second Workshop on Natural Language Processing and Computational Social Science, Aug. 3, 2017, 17-26.
Roy, et al., "Automated Linguistic Personalization of Targeted Marketing Messages Mining User-Generated Text on Social Media", Springer International Publishing Switzerland 2015, 2015, 203-224.
Sutskever, et al., "Sequence to Sequence Learning with Neural Networks", Advances in Neural Information Processing Systems, 2014, 9 pages.
Volske, et al., "TL;DR: Mining Reddit to Learn Automatic Summarization", Proceedings of the Workshop on New Frontiers in Summarization, Sep. 7, 2017, 59-63.

\* cited by examiner

MACHINE LEARNING TECHNIQUES FOR GENERATING DOCUMENT SUMMARIES TARGETED TO AFFECTIVE TONE

FIELD OF THE INVENTION

This disclosure relates generally to the field of artificial intelligence, and more specifically relates to machine-learning techniques for summarizing text based on an affective tone or other user preference.

BACKGROUND

Summarization systems are used to provide short summaries of text articles. For example, summarization of text content provides a relatively brief overview of an article to an end user. In some cases, summarization of text saves time for the end user. In addition, summarization systems that utilize machine learning techniques rapidly provide text summaries for large volumes of text documents. For example, some conventional summarization systems use neural networks to rapidly summarize news articles, webpage comments, or other sources of text documents. However, present techniques for text summarization do not account for affective preferences, such as psychological or linguistic preferences, of a user. For example, a business person having an affective preference for formality may prefer text summaries with more formal language, while a teenager having an affective preference for casualness may prefer text summaries with more informal language or slang.

In some cases, a summary generated by a conventional summarization system includes language that irritates or confuses a user who has a particular affective preference. In addition, a non-affective text summary results in relatively poor user comprehension or user engagement with the non-affective text summary. Some conventional summarization systems modify an existing text summary to accommodate user preference, such as by substituting terms in a previously generated summary. However, conventional systems for modifying summaries do not account for affective preference during the generation of the text summary.

SUMMARY

According to certain embodiments, an affective summarization system is configured to provide affective text summaries of a text document. The affective summarization system includes, for example, a summarization neural network and an affect predictor neural network. In some cases, the affect predictor neural network determines an affect level indicating an affective preference, such as a target affect level that is based on words included in the text document. Based on the affect level, an embeddings generator in the summarization neural network extracts an embeddings sequence indicating a combination of the affective preference and words in the text document. An encoder subnetwork in the summarization neural network extracts a hidden state sequence based on the embeddings sequence. A decoder subnetwork in the summarization neural network generates the affective text summary based on the hidden state sequence.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

As discussed above, prior techniques for summarizing text do not account for affective preference in the generation of a text summary. In some cases, a non-affective text summary causes relatively poor user comprehension or user engagement with the non-affective text summary, while an affective text summary improves user comprehension and enjoyment. In addition, conventional summarization systems do not generate multiple summaries based on various affective preferences. Since affective preferences vary with users, it is beneficial to develop techniques for summarizing text based on an affect or affective preference. In some cases, generating multiple affective text summaries that are tailored to a variety of affective preferences improves accessibility of the summaries, such as to multiple groups of users with different preferences.

Certain embodiments described herein address the shortcomings of conventional summarization systems by providing affective text summaries generated based on respective affect levels. For example, a particular affective text summary is tailored to a target affect level, such as a level of formality that is a preference of a particular user. The described embodiments allow, for example, improved comprehension of the affective text summary by a user. Additionally or alternatively, the described embodiments provide improved personalization of summaries provided to a user, such as by incorporating the user's affective preferences.

In some cases, conventional summarization systems include neural networks that are configured to provide a non-affective text summary. Such conventional systems can provide, for example, summarizations of numerous text documents. Embodiments described herein provide an improvement to conventional summarization systems by allowing generation of affective text summaries, which are comprehensible and enjoyable to a large number of users with a variety of affective preferences. In addition, the affective text summaries are generated directly by the affective summarization system, rather than during a post-processing stage (e.g., by modifying certain words in an existing summary). The described embodiments provide an improvement to conventional summarization systems by enabling efficient and accurate mechanism to generate affective text summaries. Further, generating multiple affective text summaries based on an input text document enables affective summarization systems to customize the affective summaries toward any number of user preferences, improving the summarization system's effectiveness and functionality for a wider variety of users.

The following examples are provided to introduce certain embodiments of the present disclosure. In some embodiments, an affective summarization system receives a text document for summarization, such as a news post or scientific journal article. In the affective summarization system, an affect predictor subnetwork analyzes the words in the document, and determines an target affect level, such as a level of formality. The target affect level includes, for example, a numeric value describing how strongly the affect is to be expressed in the output summary, such as level 0 for "very informal" or level 5 for "very formal." Based on the target affect level, an embeddings generator in the affective summarization system generates an embeddings sequence that represents words in the document and also the affective preference indicated by the affective level. The embeddings generator creates a numeric representation of the affect, such as a vocabulary token or an embedding vector, that is included in the embeddings sequence. A summarization subnetwork in the affective summarization system generates and outputs the affective text summary based on the embeddings sequence and the document. For example, an encoder/decoder pair in the summarization subnetwork analyze the words in the document with the embeddings information, and output an affective summary based on the combination of the embeddings and the document words. In some cases, the generated affective summary is provided to an additional computing system, such as a user device or a summary archive system.

As used herein, the term "affect" refers to an affective preference of a user, such as a user who reads a text document or a text summary. An affect includes psychological or linguistic preferences. Additionally or alternatively, an affect is represented by selections for words in a sequence, such as words selected for a text summary. An affect represents, for example, a level of formality compared to informality, a level of politeness compared to rudeness, a level of objectivity compared to opinionation, or levels of other psycho-linguistic preferences. Additionally or alternatively, affect is represented by the selection of words, such as by selecting (or avoiding selection of) slang, technical jargon, emotional terminology, neutral terminology, or other suitable categories of words that convey an affectation.

As used herein, the term "neural network" refers to one or more computer-implemented networks capable of being trained to achieve a goal. Unless otherwise indicated, references herein to a neural network include one neural network or multiple interrelated neural networks that are trained together.

As used herein, the term "embeddings" refers to numeric representation of relationships between words in a sequence. For example, a neural network is trained to produce a vector that represents a sequence of words via a series of numbers in the vector. Additionally or alternatively, an embeddings sequence includes at least one numeric value (e.g., a value in a vector cell, a series of values in a vector dimension) representing embeddings information for a word sequence, such as numbers representing relationships between the words in the sequence, or numbers representing an affect level of the words. In some cases, embeddings sequences for multiple word sequences are represented by multiple dimensions of a vector. For example, a data set with multiple tuples could include a multi-dimensional vector that includes multiple embeddings sequences for multiple respective word sequences.

As used herein, the term "text document" refers to a collections of characters that conveys information about a given topic, such as a news article. A text document includes a sequence of words, such as sentences. A text document may be an article, a weblog post, a poem, a piece of computer code, a collection of comments in an online forum, a collection of posts in a social media application, or any other collection of characters that conveys information on a given topic.

Figure 1:
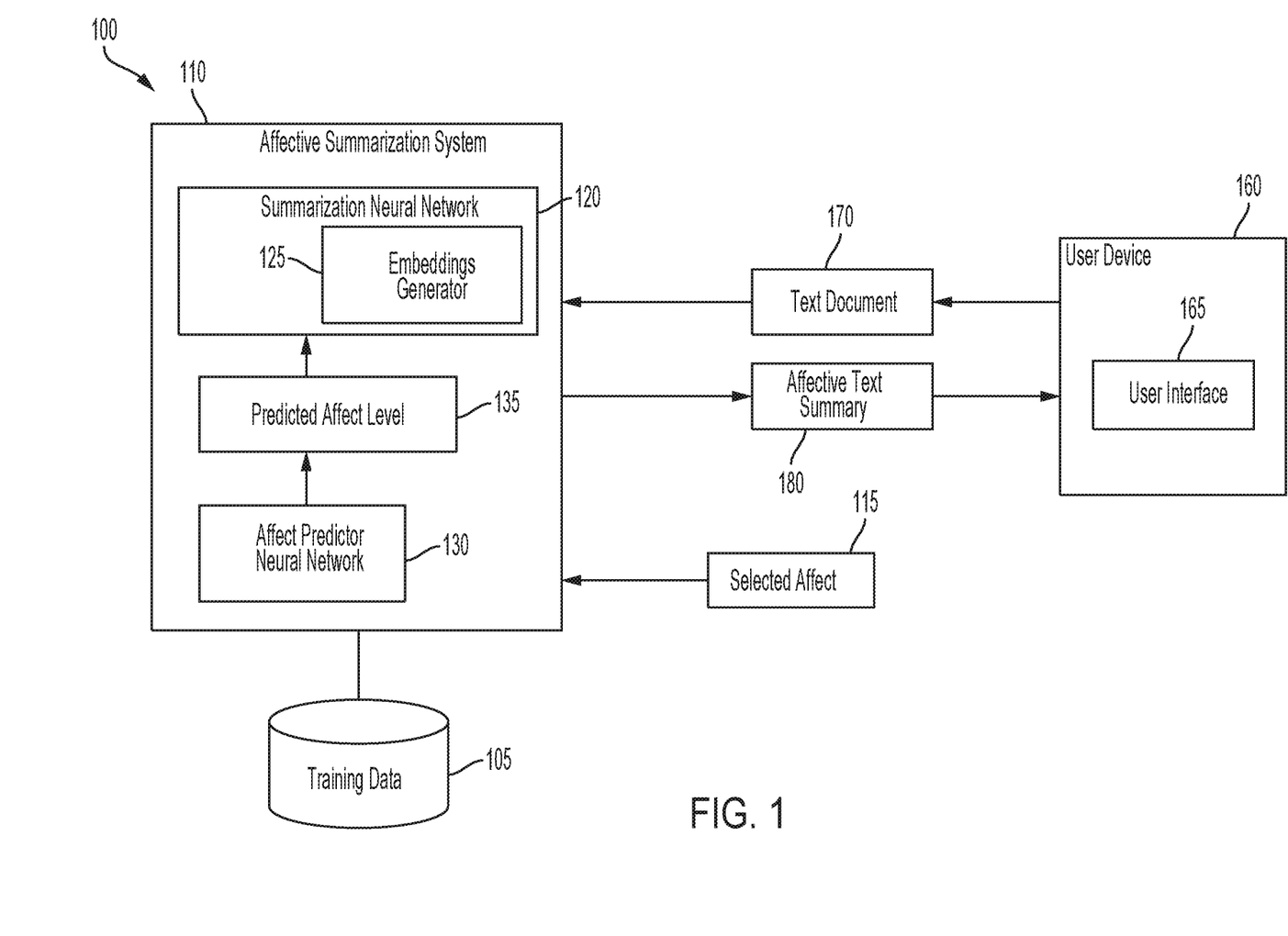
FIG. 1 is a block diagram depicting an example of a computing system that includes an affective summarization system, according to certain embodiments.

Referring now to the drawings, FIG. 1 is an example of a computing system 100 that includes an affective summarization system 110. The affective summarization system 110 includes multiple neural network components, including a summarization neural network 120 and an affect predictor neural network 130. In some cases, the affective summarization system 110 is capable of accessing one or more repositories of training data, such as training data 105. Additionally or alternatively, one or more of the summarization neural network 120 or the affect predictor neural network 130 are trained, or configured to be trained, based on the training data 105. In some cases, the affective summarization system 110, or one or more of the neural networks 120 or 130, are implemented on one or more computing devices, including virtual computing devices (e.g., cloud computing services). For example (and not by way of limitation), the affective summarization system 110 and the neural networks 120 and 130 are executed by one or more networked computing devices, such as multiple servers (including virtual servers) that are configured to work together to provide affective summaries of text.

In some embodiments, the affective summarization system 110 is configured to receive one or more text documents, such as a text document 170. The text document 170 is an electronic data file that includes, for example, character data (e.g., a character data type). The character data in the text document 170 indicates a sequence of words, such as words in an article, weblog post, or other collection of words to be read by a human. In some cases, the text document 170 is received from (or otherwise indicated by) a computing device, such as a user device 160. For example, the user device 160 provides the text document 170 (or an indication of the text document 170) to the affective summarization system 110 via one or more computing networks. The user device 160 includes, for example, a personal computer, a laptop computer, a personal mobile device, a tablet computer, or any other suitable computing device. In some cases, the user device 160 includes a user interface 165 via which a person may access affective summarization services provided by the affective summarization system 110. For example, the person may indicate, via an input to the user interface 165, that the text document 170 is to be provided to the affective summarization system 110. Additionally or alternatively, the person may view (or otherwise receive) an affective summary, such as the affective text summary 180, via an output of the user interface 165.

In FIG. 1, the affective summarization system 110 is configured to receive one or more selected affects, such as a selected affect 115. The selected affect 115 includes, for example, an affect label indicating an affective preference. In some cases, the selected affect 115 is received by (or otherwise indicated to) the affective summarization system 110 from an additional computing system. For example, the selected affect 115 is received from the user device 160, such as an affect indicated by an input to the user interface 165. Additionally or alternatively, the selected affect 115 is received from an additional computing system configured to determine the selected affect 115 based on information about a user of the user device 160. For example, the selected affect 115 is determined based on information about a browsing history of the user of the user device 160.

In some embodiments, the affective summarization system 110 includes one or more neural networks or subnetworks, such as subnetworks that are configured to interact with each other. For example, the summarization neural network 120 and the affect predictor neural network 130 are configured to provide or receive inputs or outputs. The affect predictor neural network 130 is configured to accept, for example, one or more of the text document 170 or the selected affect 115 as inputs. Additionally or alternatively, the affect predictor neural network 130 is configured to provide an output, such as a predicted affect level 135, to the summarization neural network 120. In some cases, an output from the affect predictor neural network 130 is received as an input to the summarization neural network 120. For example, the summarization neural network 120 is configured to provide an additional output, such as the affective text summary 180, based on the predicted affect level 135 received as an input from the affect predictor neural network 130. In some cases, the summarization neural network 120 is configured to provide the affective text summary 180 based on a combination of inputs, such as the predicted affect level 135 and the text document 170. Additionally or alternatively, the summarization neural network 120 includes an embeddings generator 125. The embeddings generator 125 is configured, for example, to determine an embeddings sequence indicating an affective property based on one or more of the text document 170 or the predicted affect level 135.

In some cases, an affective summarization system, such as the affective summarization system 110, is trained based on training data, such as the training data 105. Neural networks or subnetworks that are included in the affective summarization system may be trained individually or together. For example, in the affective summarization system 110, the affect predictor neural network 130 and the summarization neural network 120 are trained together based on respective sets of training data (or modified training data). However, other implementations are possible, including training subnetworks in an affective summarization system together on a particular set of training data. In some embodiments, the affective summarization system 110 is trained based on a modified training dataset (or modified portion of the training dataset). For example, an affect predictor neural network, such as the affect predictor neural network 130, is trained based on a first training dataset that is modified to include a discrete affect level. Additionally or alternatively, a summarization neural network, such as the summarization neural network 120, is based on a second training dataset that is modified to include embeddings information representing an affect level. The first and second modified training datasets are based, for example, on part or all of the training data 105.

Figure 2:
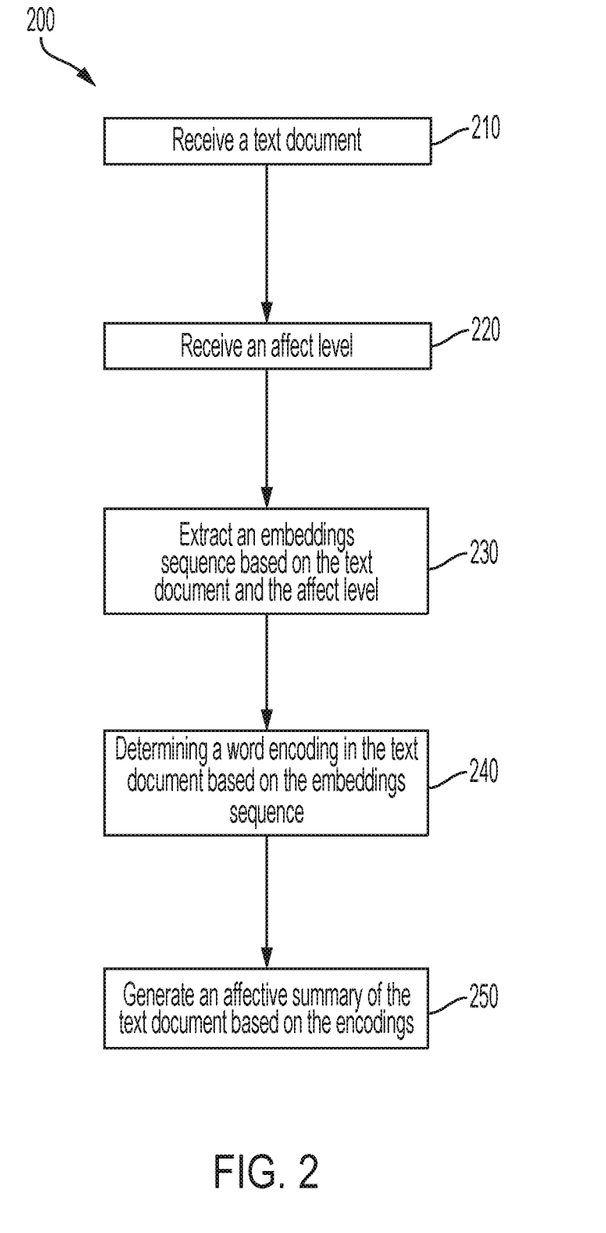
FIG. 2 is a flow chart depicting an example of a process for generating an affective text summary, according to certain embodiments.

FIG. 2 is a flow chart depicting an example of a process 200 for generating an affective text summary. In some embodiments, such as described in regards to FIG. 1, a computing device executing an affective summarization system implements operations described in FIG. 2, by executing suitable program code. The operations of process 200 can be used to implement a step for generating an affective text summary of an input text document based on a affective hidden state sequence extracted from an embeddings sequence. For illustrative purposes, the process 200 is described with reference to the examples depicted in FIG. 1. Other implementations, however, are possible.

At block 210, the process 200 involves receiving a text document, such as the text document 170. The received text document includes a sequence of words, such as an article, a weblog post, a review or comment, or any other suitable sequence of words. In some cases, the text document is received from an additional computing system, such as the user device 160, based on an indication from a user of the additional computing system. Additionally or alternatively, the text document is received from an additional computing system based on an automated indication, such as a computing device that is configured to automatically select text documents for summarization.

At block 220, the process 200 involves receiving an affect level, such as the predicted affect level 135. In some cases, the affect level is received from one or more subnetworks looted in the affective summarization system, such as the affect predictor neural network 130. Additionally or alternatively, the affect level is received from an additional computing system. For example, the affective summarization system could receive an affect level from a computing device that is configured to select a target affect for a particular affective text summary.

At block 230, the process 200 involves extracting an embeddings sequence based on one or more of the received text document or affect level. For example, an embeddings generator, such as the embeddings generator 125, extracts the embeddings sequence based on the predicted affect level 135 and the text document 170. In some cases, the extracted embeddings sequence includes one or more vectors of numbers, such as a one-hot vector or a vocabulary token, that indicate embedded affective properties of words in the received text document, based on the affect level.

At block 240, the process 200 involves determining an encoding of words in the text document, based on the embeddings sequence. In some cases, an encoder neural network, such as an encoder that is included in the summarization neural network 120, extracts a hidden sequence based on the received text document and the embeddings sequence. The extracted hidden sequence, for example, indicates encodings of words in the text document based on the affective properties indicated by the embeddings sequence.

At block 250, the process 200 involves generating an affective text summary, such as the affective text summary 180, corresponding to the received text document. In some cases, the generated affective text summary is based on word encodings, such as described in relation to block 240. Additionally or alternatively, a decoder neural network, such as a decoder that is included in the summarization neural network 120, generates the affective text summary based on a hidden sequence generated by an encoder neural network. For example, a decoder analyzes the hidden sequence received from the encoder, and generates a word-by-word output. In some cases, the affective text summary includes (or is otherwise based on) the word-by-word output provided by the decoder.

In some embodiments, the affective summarization system outputs the affective text summary generated by the process 200. In one example, a computing device implementing the affective summarization system could transmit (or cause the transmission of) the affective text summary to another computing device. In another example, a computing device implementing the affective summarization system could store (or cause the storage of) the affective text summary in a non-transitory computer-readable medium accessible to another computing device or to an application separate from the affective summarization system. In another example, a computing device implementing the affective summarization system could cause a display device to display some or all of the affective text summary.

Figure 3:
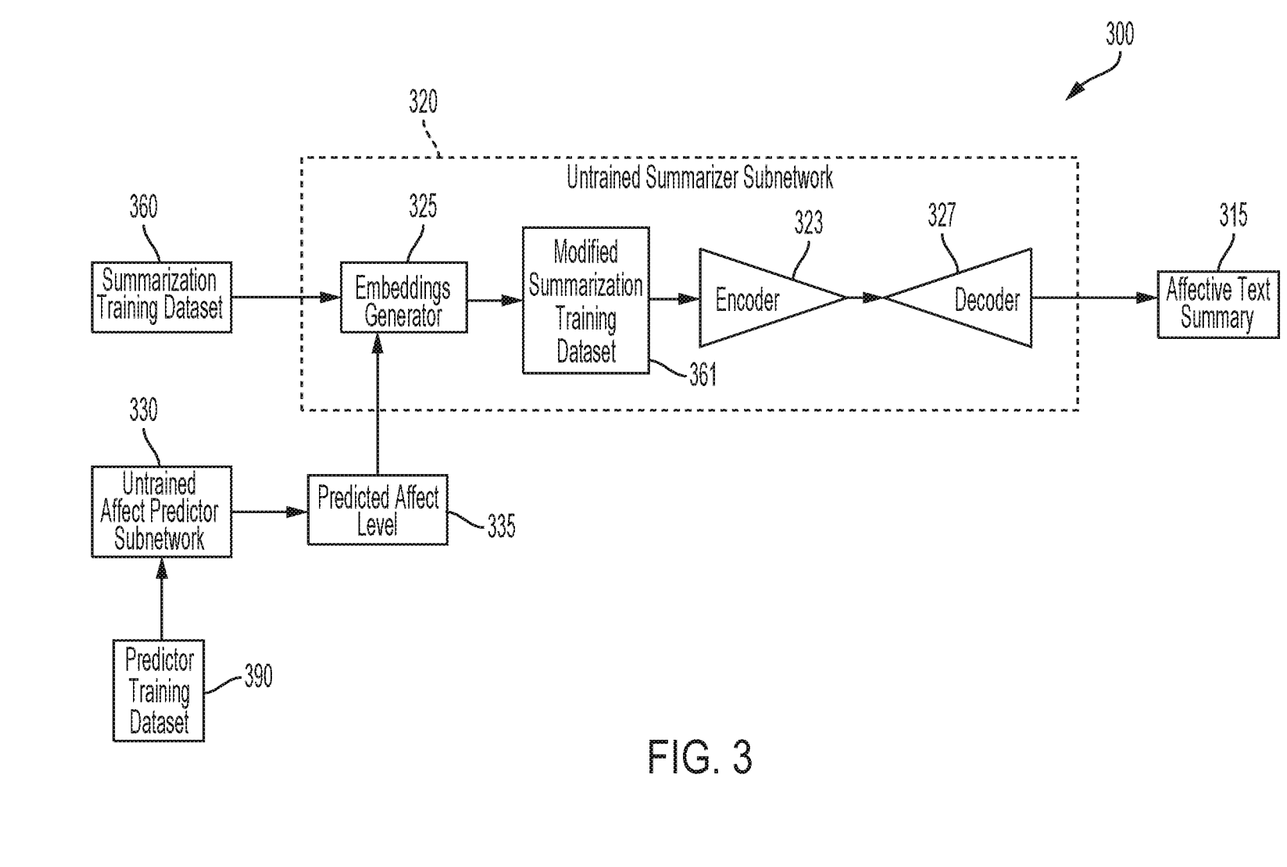
FIG. 3 is a block diagram depicting an example of a computing system in which multiple subnetworks are trained to provide one or more affective text summaries, according to certain embodiments.

In some embodiments, multiple neural networks or subnetworks are trained to provide an affective text summary. FIG. 3 is an example of a computing system 300 in which multiple subnetworks are trained to provide one or more affective text summaries, such as the affective text summary 315. In some cases, the computing system 300 includes, or is included in, an affective summarization system, such as an instance of the affective summarization system 110. In FIG. 3, neural networks or subnetworks included in the computing system 300 are untrained or partially trained. For example, subnetworks included in the computing system 300 may be undergoing training (or retraining) together to improve output, such as to provide a more accurate affective text summary. In FIG. 3, the computing system 300 includes one or more of an untrained summarizer subnetwork 320 or an untrained affect predictor subnetwork 330. In regards to FIG. 3, the subnetworks 320 and 330 are referred to as "untrained" for convenience, and not by way of limitation. It is to be understood that the techniques described in regards to FIG. 3 may be applied to partially trained neural networks, or to neural networks that are undergoing retraining.

In some cases, subnetworks in the computer system 300 are trained based on one or more of a summarization training dataset 360 or a predictor training dataset 390. The summarization training dataset 360 includes one or more article sequences and summaries corresponding to each of the article sequences. Additionally or alternatively, the predictor training dataset 390 includes one or more word sequences and corresponding affect levels. In some cases, such as if the subnetworks 320 and 330 are being trained together, the word sequences in the predictor training dataset 390 are identical to the summaries included in the summarization training dataset 360.

In FIG. 3, the untrained affect predictor subnetwork 330 is trained based on the word sequences and affect levels included in the predictor training dataset 390. In some cases, the predictor training dataset 390 is modified to include discrete affect levels. By training on the predictor training dataset 390, the untrained affect predictor subnetwork 330 is configured to provide an output including the predicted affect level 335. For example, the untrained affect predictor subnetwork 330 is trained to provide the predicted affect level 335 based on one or more inputs of text or a target affect, such as summaries and discrete affect levels included in the dataset 390.

Additionally or alternatively, the untrained summarizer subnetwork 320 is trained based on the article sequences and summaries included in the summarization training dataset 360. In some cases, the summaries included in the summarization training dataset 360 are identical to the summaries included in the predictor training dataset 390. For example, the untrained affect predictor subnetwork 330 and the untrained summarizer subnetwork 320 may be trained on a particular group of summaries included in the respective training datasets 360 and 390.

In FIG. 3, one or more components of the untrained summarizer subnetwork 320 are trained based on the summarization training dataset 360. For example, the untrained summarizer subnetwork 320 includes an embeddings generator 325, an encoder 323, and a decoder 327. The encoder 323 and decoder 327 are implemented, for example, as a long-short-term memory neural network, a convolutional neural network, a transformable neural network, or any other suitable neural network or combination of neural networks. The embeddings generator 325 is trained based on one or more of the predicted affect level 335 and the article sequences and summaries included in the summarization training dataset 360. In some cases, the embeddings generator 325 is trained to determine an embeddings sequence for each of the article sequences. For example, the embeddings generator 325 determines one or more numeric vectors that represent embeddings of the predicted affect level corresponding to each article sequence.

In some cases, one or more components of the untrained summarizer subnetwork 320 are trained based on a modified dataset, such as a modified summarization training dataset 361. The modified summarization training dataset 361 includes the summaries and an embeddings sequence (e.g., determined by the embeddings generator 325) corresponding to each of the article sequences. In some cases, the modified summarization training dataset 361 is modified to include the summaries and corresponding embeddings sequences, without including the corresponding article sequences. In FIG. 3, the encoder 323 and the decoder 327 are trained based on one or more of the summarization training dataset 360 and the modified summarization training dataset 361. For example, during training the encoder 323 receives and analyzes the article sequences and the training dataset 361. The encoder 323 is trained to generate a hidden state sequence indicating the embedded affect of words in the article sequences. Additionally or alternatively, during training the decoder 327 receives the hidden state sequence from the encoder 323. The decoder 327 is trained to generate the affective text summary 315 based on the embedded affect of the article sequences, as indicated by the hidden state sequence. For example, the decoder 327 generates an output word based on a particular hidden state in the hidden state sequence. Additionally or alternatively, the decoder 327 appends the output word to a partial summary sequence. In some cases, the decoder 327 generates the affective text summary 315 based on one or more output words, such as by building the partial summary sequence using word-by-word outputs, and generating the affective text summary 315 based on the partial summary sequence (e.g., when the word-by-word sequence is completed).

Figure 4:
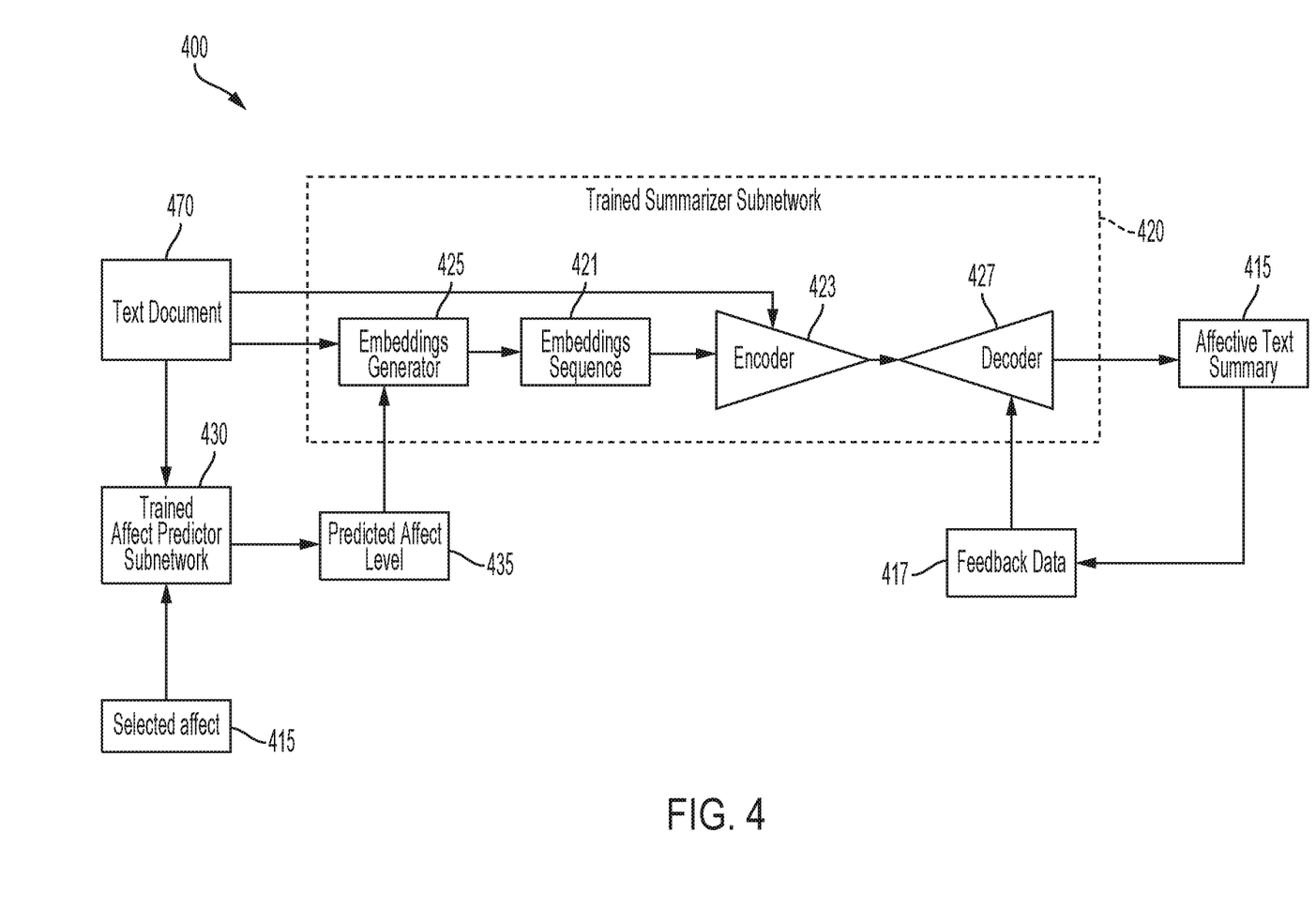
FIG. 4 is a block diagram depicting an example of a computing system in which multiple trained subnetworks are configured to provide one or more affective text summaries, according to certain embodiments.

In some embodiments, multiple trained neural networks or subnetworks are configured to interact with each other to provide an affective text summary. FIG. 4 is an example of a computing system 400 in which multiple trained subnetworks are configured to provide one or more affective text summaries, such as the affective text summary 415. In some cases, the computing system 400 includes, or is included in, a trained affective summarization system, such as a trained instance of the affective summarization system 110.

In FIG. 4, the computing system 400 includes one or more of a trained summarizer subnetwork 420 or a trained affect predictor subnetwork 430. The trained subnetworks 420 and 430 are trained, for example, as described in regards to FIG. 2. In some cases, one or more of the trained subnetworks 420 or 430 include one or more component subnetworks. For example, the trained summarizer subnetwork 420 includes an embeddings generator 425, an encoder 423, and a decoder 427. The encoder 423 and decoder 427 are implemented, for example, as a long-short-term memory neural network, a convolutional neural network, a transformable neural network, or any other suitable neural network or combination of neural networks. Additionally or alternatively, the trained subnetworks 420 and 430 are configured to interact with each other. For example, the trained affect predictor subnetwork 430 provides an output that is received as an input by the embeddings generator 425 in the trained summarizer subnetwork 420.

In some cases, the trained affect predictor subnetwork 430 generates a predicted affect level 435 based on one or more inputs. For example, the predicted affect level 435 is based on an input including text, such as a text document 470, an input indicating a target affect, such as the selected affect 415, or any other suitable input or combination of inputs.

In the trained summarizer subnetwork 420, the embeddings generator 425 receives one or more of the text document 470 or the predicted affect level 435 as inputs. Additionally or alternatively, the embeddings generator 425 generates an embeddings sequence 421 based on the text document 470 and the predicted affect level 435. For example, the embeddings sequence 421 includes vector representations of the embedded affect of words included in the text document 470.

In the trained summarizer subnetwork 420, the encoder 423 receives one or more of the text document 470 and the embeddings sequence 421 as inputs. The encoder 423 generates, based on the embeddings sequence 421, a hidden state indicating the embedded affect of words included in the text document 470. Additionally or alternatively, the decoder 427 receives from the encoder 423 the hidden state, and generates the affective text summary 415 based on the hidden state. In some cases, the affective text summary 415 includes a summary of the text document 470 that reflects the affect indicated by the predicted affect level 435. Additionally or alternatively, the affective text summary 415 is provided as an output from the trained summarizer subnetwork 420.

In some embodiments, feedback data 417 is provided to the decoder 427 as an input. The feedback data 417 indicates, for example, information about a word (e.g., the most recently generated word) included in the affective text summary 415. In some cases, the feedback data 417 is provided as an input to a recursive neural network that is included in (or associated with) the decoder 427. Although FIG. 4 indicates that feedback data 417 is provided but to the decoder 427, other implementations are possible. For example, a decoder in a trained summarizer subnetwork provides an affective text summary without receiving feedback data as an input.

Training a Predictor Neural Network

In some embodiments, a predictor neural network is trained based on a modified predictor training dataset that is modified to include one or more discrete affect levels. For example, an unmodified predictor training dataset includes an annotated sequence of words, such as words from a training article. In some cases, the unmodified training set includes annotations, such as an annotation indicating an affect score. The affect score describes, for example, an annotation from a group of human reviewers of the training article. In some cases, the affect score is a number representing a combination (e.g., an average, a weighted average) of annotations from the group of reviewers. Additionally or alternatively, the affect score is a numeric score on a continuous scale. For example, and not by way of limitation, the affect score could be on a scale of −1 to +1. Additionally or alternatively, the affect score is on a scale between levels of an affect type, such as where −1 indicates an informal affect and +1 indicates a formal affect.

In some cases, an unmodified predictor training dataset $D_A$ represents one or more word sequences x and one or more corresponding affect scores y, such as in the example Equation 1.

$$D_A = (x, y) \qquad \text{Eq. 1}$$

In Equation 1, dataset $D_A$ includes tuples of the form $(x_i, y_i)$, where $x_i$ is the ith word sequence in the set of word sequences x, $y_i$ is the ith affect score in the set of affect scores y, and the word sequence $x_i$ corresponds to the affect score $y_i$. Each affect score $y_i$ describes, for example, an annotation (or combination of annotations) from one or more human reviewers who have reviewed the corresponding word sequence $x_i$. In Equation 1, each affect score $y_i$ has a value on a continuous scale between −1 and +1.

In some cases, the affect scores y are normalized. Additionally or alternatively, a discrete affect level is determined based on the normalized scores. For example, each affect score $y_i$ is assigned to one of k bins, such as a set of k bins including the bins $\{t_1, t_2, \ldots, t_k\}$, where each bin indicates a discrete level for the normalized affect scores. Additionally or alternatively, a modified predictor training dataset $D_A^*$ is generated based on the unmodified dataset $D_A$ and the discrete affect levels, such as in the example Equation 2.

$$D_A^* = (x, t) \qquad \text{Eq. 2}$$

In Equation 2, dataset $D_A^*$ includes tuples of the form $(x_i, t_i)$, where $x_i$ is the ith word sequence in the set of word sequences x, $t_i$ is the ith affect level in the set of affect levels t, and the word sequence $x_i$ corresponds to the affect level $t_i$. Each affect level $t_i$ describes, for example, a normalized (e.g., binned) affect score that is assigned to one of the k bins $\{t_1, t_2, \ldots, t_k\}$. In Equation 2, each affect level $t_i$ has a value based on one of the k bins $\{t_1, t_2, \ldots, t_k\}$.

In some embodiments, a predictor neural network, such as the affect predictor neural network 130, is trained based on a modified predictor training dataset, such as the modified predictor training dataset $D_A^*$. For example, the predictor neural network trains a function, such as the function $M_A(x)$ in the example Equation 3.

$$M_A(x) = t \qquad \text{Eq. 3}$$

In Equation 3, the function $M_A(x)$ receives x as an input, where x is a set of one or more word sequences, such as described in relation to Equations 1 and 2. In Equation 3, the set x corresponds to a set t of one or more discrete affect levels. In some implementations, the function $M_A(x)$ describes, for example, a support vector machine that is trained to classify an affect level t based on an input x. Additionally or alternatively, the function $M_A(x)$ describes, for example, a neural network (e.g., a feed-forward neural network, a recurrent neural network) that is trained to determine an affect level t based on an input x, or based on relations between words included in the word sequence(s) of input x.

During training, the function $M_A(x)$ is trained, for example, on the tuples (x, t) included in the modified dataset $D_A^*$. In the example training, the predictor neural network trains the function $M_A(x)$ to produce an output t based on the input x. For example, the function $M_A(x)$ is trained to output an affect level t based on the input word sequence x. During training, the predictor neural network adjusts objectives and parameters of the function $M_A(x)$ to obtain an output t that is identical or similar to a known affect level $t_i$ based on the input word sequence $x_i$ (e.g., known tuples $(x_i, t_i)$ from the modified training dataset In some cases, the function $M_A(x)$ is trained until the output t is within a threshold similarity to the known affect level $t_i$.

Figure 5:
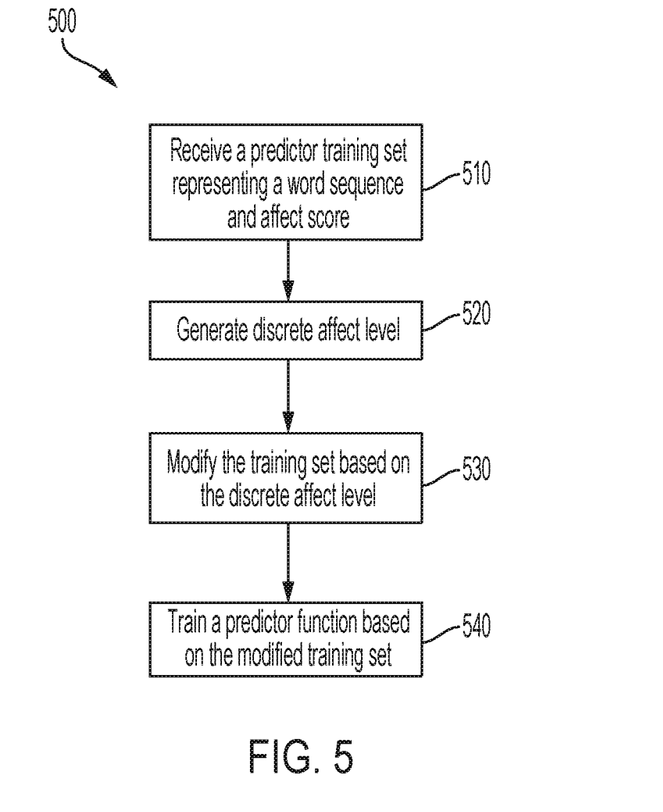
FIG. 5 is a flow chart depicting an example of a process for training a predictor neural network, according to certain embodiments.

FIG. 5 is a flow chart depicting an example of a process 500 for training a predictor neural network. In some embodiments, such as described in regards to FIGS. 1-4, a computing device executing an affective summarization system implements operations described in FIG. 5, by executing suitable program code. For illustrative purposes, the process 500 is described with reference to the examples depicted in FIGS. 1-4. Other implementations, however, are possible.

At block 510, the process 500 involves receiving a predictor training dataset, such as the predictor training dataset 390. In some embodiments, the predictor training dataset includes one or more word sequences and corresponding affect scores. For example, the predictor training dataset, such as dataset $D_A$ described in regards to Equation 1, includes one or more tuples (x, y) indicating the word sequences and affect scores. In some cases, the predictor training dataset includes multiple annotated word sequences and corresponding affect scores indicated by the annotations. Additionally or alternatively, the predictor training dataset is unmodified.

At block 520, the process 500 involves generating one or more discrete affect levels based on the predictor training dataset. In some cases, each discrete affect level corresponds to a respective word sequence included in the predictor training dataset. Additionally or alternatively, each discrete affect level is based on a normalization of the affect score corresponding to the respective word sequence. For example, a discrete affect level $t_i$ is generated based on an affect score $y_i$ that is assigned to one of k bins.

At block 530, the process 500 involves modifying the predictor training dataset based on the one or more discrete affect levels. In some embodiments, the modified predictor training dataset includes the word sequences (e.g., from the unmodified dataset) and the corresponding discrete affect levels. For example, the modified predictor training dataset, such as dataset $D_A^*$ described in regards to Equation 2, includes one or more tuples (x, t) indicating the word sequences and affect levels.

At block 540, the process 500 involves training a predictor function based on the modified predictor training dataset. For example, a predictor neural network, such as the affect predictor neural network 130, trains the predictor function to provide an output discrete affect level based on an input word sequence. For example, the predictor neural network trains the prediction function, such as the function $M_A(x)$ described in regards to Equation 3, to output an affect level t based on the input word sequence x.

In some cases, one or more operations related to the process 500 are repeated. For example, a predictor neural network may repeat one or more operations related to block 540 until the trained predictor function provides an output discrete affect level within a threshold similarity to a known affect level. Additionally or alternatively, a predictor neural network that is undergoing retraining, or additional training, performs one or more operations related to process 500 for multiple predictor training datasets.

Training a Summarization Neural Network

In some embodiments, a summarization neural network is trained based on a modified summarization training dataset that is modified to include information about one or more affective properties. For example, an unmodified summarization training dataset includes a sequence of article words, such as words from a training article, and a sequence of summary words, such as words from a training summary of the training article. In some cases, the unmodified training set includes one or more affective properties, such as an affect that is represented by the summary sequence. For example (and not by way of limitation) the unmodified training set includes a summary sequence with words indicating a level of formality and a level of politeness of the training summary.

In some cases, an unmodified summarization training dataset $D_S$ represents one or more article word sequences a and one or more corresponding summary word sequences s, such as in the example Equation 4.

$$D_S = (a, s) \qquad \text{Eq. 4}$$

In Equation 4, dataset $D_S$ includes tuples of the form $(a_i, s_i)$, where $a_i$ is the ith article word sequence in the set of article sequences a, $s_i$ is the ith summary word sequence in the set of summary sequences s, and the article sequence $a_i$ corresponds to the summary sequence $s_i$. Each summary sequence $s_i$ includes, for example, a sequence of words summarizing the corresponding article sequence $a_i$. In Equation 4, each article sequence $a_i$ and each summary sequence $s_i$ include data, such as text data, representing words in the respective sequence. In some cases, the article sequences and summary sequences also include additional data representing text data that is not an alphanumeric character, such as "start" data representing the beginning of a sequence, "end" data representing the end of a sequence, data representing paragraph or line breaks, or other suitable non-alphanumeric text data.

In some cases, information about one or more affects of each respective summary word sequence is generated. For example, a sequence of embeddings is generated based on a corresponding summary sequence, where the embeddings sequence represents an affect of the corresponding summary sequence. Additionally or alternatively, a modified summarization training dataset $D_S^*$ is generated based on the unmodified dataset $D_S$ and the embeddings sequence, such as in the example Equation 5.

$$D_S^* = \{(e_i, s_i) | (a_i, s_i) \in D_S\} \qquad \text{Eq. 5}$$

In Equation 5, the modified dataset $D_S^*$ includes a tuple of the form $(e_i, s_i)$, for every tuple $(a_i, s_i)$ belonging to the unmodified dataset $D_S$. In the modified dataset $D_S^*$, $e_i$ is the ith embeddings sequence in the set of embeddings sequences e, $s_i$ is the ith summary word sequence in the set of summary sequences s, and the embeddings sequence $e_i$ corresponds to the summary sequence $s_i$. Each embeddings sequence $e_i$ includes, for example, a vector of numeric values representing the affect properties of the corresponding summary sequence $s_i$. Additionally or alternatively, each embeddings sequence $e_i$ is based on the article sequence $a_i$ (e.g., corresponding to the summary sequence $s_i$) and on an affect level $t_i$, such as in the example Equation 6.

$$e_i = F(a_i, t_i) \qquad \text{Eq. 6}$$

In Equation 6, the embeddings function $F(a_i, t_i)$ receives as inputs the article sequence $a_i$ and a corresponding affect level $t_i$. In some cases, the affect level $t_i$ is based on the summary sequence $s_i$ and Equation 3, such as the function $M_A(s_i)$ providing the affect level $t_i$ based on receiving the summary sequence $s_i$ as an input. Additionally or alternatively, the embeddings function F(a, t) is trained to generate the embeddings sequence e. For example, an embeddings generator, such as the embeddings generator 225, trains the function $F(a_i, t_i)$ to generate the embeddings sequence $e_i$ based on the tuples (a, s) included in the unmodified dataset $D_S$. In the example training, the embeddings generator trains the embeddings function F(a, t) to produce an output e based on the inputs a and t. For example, the function $F(a_i, t_i)$ is trained to output a respective embeddings sequence $e_i$ based on the article sequence $a_i$ and the affect level $t_i$, where $t_i$ is received as an output from a predictor neural network trained to determine $t_i$ based on the function $M_A(s_i)$ of the corresponding summary sequence $s_i$. During training, the embeddings generator adjusts objectives and parameters of the function $F(a_i, t_i)$ to obtain an output $e_i$. Additionally or alternatively, the modified dataset $D_S^*$ is generated based on the output from the embeddings generator.

In some implementations, the embeddings function F(a, t) describes, for example, a vocabulary token that is based, for example, on the affect level t. For example, the vocabulary token is prepended (or appended) to the input article sequence a, such that the first (or last) embedding in the output embeddings sequence e corresponds to the vocabulary token. Additionally or alternatively, the function F(a, t) describes, for example, a one-hot vector having k dimensions corresponding to the k affect level bins $\{t_1, t_2, \ldots, t_k\}$ (such as described in regards to Equation 2). The one-hot vector includes, for example, a particular cell corresponding to the affect level $t_i$, where the particular cell has a "hot" (e.g., non-zero) value. In some cases, the one-hot vector is prepended or appended to the embeddings sequence e. Additionally or alternatively, the one-hot vector is concatenated with each embeddings included in the embeddings sequence e, such that each embeddings corresponding to each respective word in the input article sequence a includes affect information indicated by the one-hot vector.

In some embodiments, a summarization neural network, such as the summarization neural network 120, is trained based on a modified summarization training dataset, such as the modified summarization training dataset $D_S^*$. For example, the summarization neural network receives (or generates) as an input the modified dataset $D_S^*$. The modified dataset $D_S^*$ includes, as tuples, the article sequence $a_i$ and the embeddings sequence $e_i$ that is generated by an embeddings generator. Based on the input article sequence $a_i$ and the affect information embedded in the input embeddings sequence $e_i$, the summarization neural network generates as an output an affective summary of the article sequence $a_i$. In some cases, the summarization neural network receives feedback about the generated affective summary, such as feedback based on each additional word generated in the affective summary.

Figure 6:
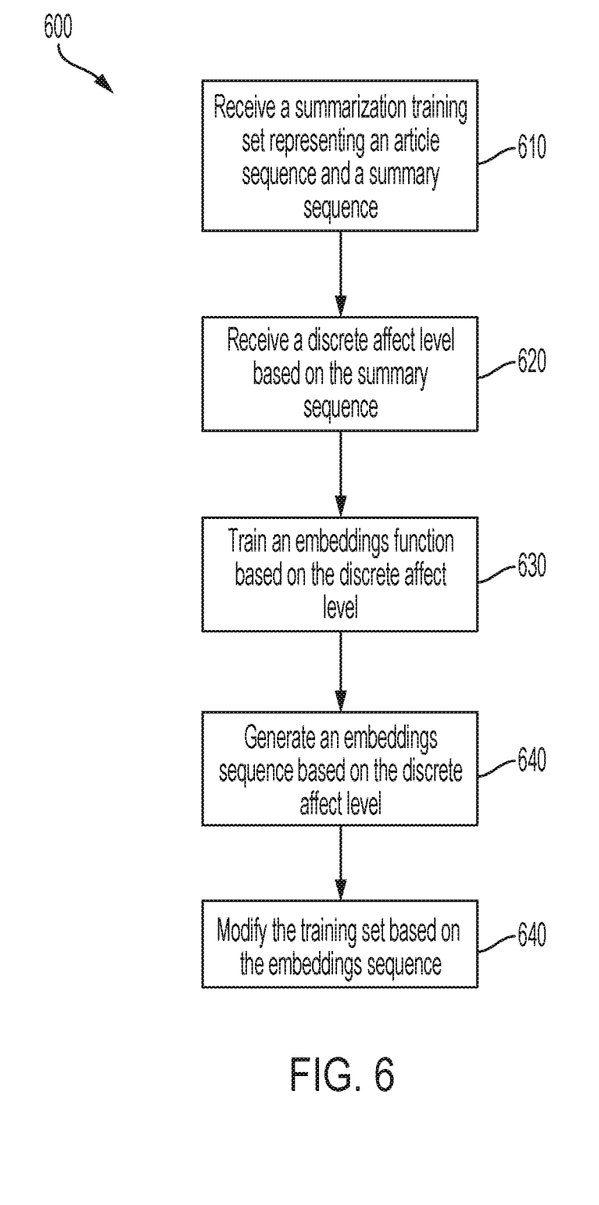
FIG. 6 is a flow chart depicting an example of a process for training a summarization neural network, according to certain embodiments.

FIG. 6 is a flow chart depicting an example of a process 600 for training a summarization neural network. In some embodiments, such as described in regards to FIGS. 1-5, a computing device executing an affective summarization system implements operations described in FIG. 6, by executing suitable program code. For illustrative purposes, the process 600 is described with reference to the examples depicted in FIGS. 1-5. Other implementations, however, are possible.

At block 610, the process 600 involves receiving a summarization training dataset, such as the summarization training dataset 360. In some embodiments, the summarization training dataset includes one or more word sequences, such as article word sequences and corresponding summary word sequences. For example, the summarization training dataset, such as dataset $D_S$ described in regards to Equation 4, includes one or more tuples (a, s) indicating the article sequences and summary sequences. In some cases, the summarization training dataset is unmodified.

At block 620, the process 600 involves receiving one or more discrete affect levels based on the summarization training dataset. In some cases, each discrete affect level is based on a respective summary sequence included in the summarization training dataset. For example, the discrete affect levels are received from a predictor neural network, such as the affect predictor neural network 130. Additionally or alternatively, the predictor neural network provides each discrete affect level, such as an affect level $t_i$, based on each respective summary sequence, such as a summary sequence $s_i$.

At block 630, the process 600 involves training an embeddings function. For example, an embeddings generator, such as the embeddings generator 125, trains the embeddings function to provide one or more embeddings sequences based on one or more of the article sequence and the corresponding discrete affect level, such as described in regards to Equation 6.

At block 640, the process 600 involves generating the one or more embeddings sequences. For example, the embeddings generator, such as the embeddings generator 125, generates each embeddings sequence based on a respective discrete affect level, such as described in regards to Equation 6. In some cases, each embeddings sequence, such as embeddings sequence $e_i$, corresponds to a discrete affect level, such as the affect level $t_i$.

At block 650, the process 600 involves modifying the summarization training dataset based on the one or more embeddings sequences. In some embodiments, the modified summarization training dataset includes the summary sequences (e.g., from the unmodified dataset) and the corresponding embeddings sequences. For example, the modified summarization training dataset, such as the dataset $D_S^*$ described in regards to Equation 5, includes one or more tuples (e, s) indicating the embeddings sequences and summary sequences. In some cases, a summarization neural network, such as the summarization neural network 120, is trained to provide one or more summary sequences based on the modified summarization training dataset. For example, the summarization neural network is trained to generate one or more summary sequences based on an input article sequence and a corresponding embeddings sequence that is included in the modified dataset.

In some cases, one or more operations related to the process 600 are repeated. For example, a summarization neural network may repeat one or more operations related to blocks 630, 640, or 650 until the trained summarization neural network (including, for example, the embeddings function or the embeddings generator) provides an output summary sequence within a threshold similarity to a known summary sequence. Additionally or alternatively, a summarization neural network that is undergoing retraining, or additional training, performs one or more operations related to process 600 for multiple summarization training datasets.

Figure 7:
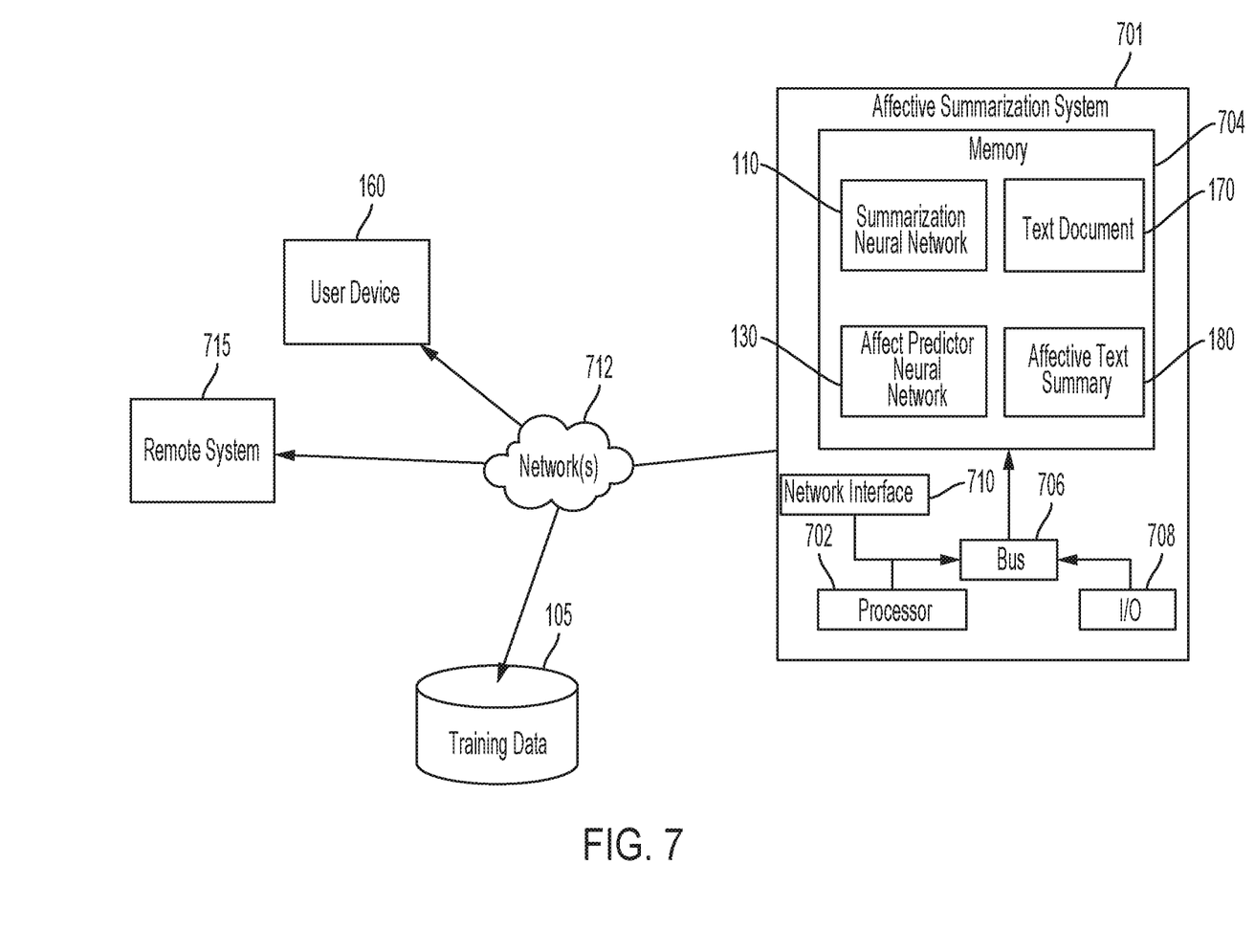
FIG. 7 is a block diagram depicting an example of a computing system for implementing an affective summarization system, according to certain embodiments.

Any suitable computing system or group of computing systems can be used for performing the operations described herein. For example, FIG. 7 is a block diagram depicting an affective summarization system, according to certain embodiments.

The depicted example of a affective summarization system 701 includes one or more processors 702 communicatively coupled to one or more memory devices 704. The processor 702 executes computer-executable program code or accesses information stored in the memory device 704. Examples of processor 702 include a microprocessor, an application-specific integrated circuit ("ASIC"), a field-programmable gate array ("FPGA"), or other suitable processing device. The processor 702 can include any number of processing devices, including one.

The memory device 704 includes any suitable non-transitory computer-readable medium for storing the summarization neural network 110, affect predictor neural network 130, text document 170, affective text summary 180, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The affective summarization system 701 may also include a number of external or internal devices such as input or output devices. For example, the affective summarization system 701 is shown with an input/output ("I/O") interface 708 that can receive input from input devices or provide output to output devices. A bus 706 can also be included in the affective summarization system 701. The bus 706 can communicatively couple one or more components of the affective summarization system 701.

The affective summarization system 701 executes program code that configures the processor 702 to perform one or more of the operations described above with respect to FIGS. 1-6. The program code includes operations related to, for example, one or more of the summarization neural network 110, the affect predictor neural network 130, the text document 170, the affective text summary 180, or other suitable applications or memory structures that perform one or more operations described herein. The program code may be resident in the memory device 704 or any suitable computer-readable medium and may be executed by the processor 702 or any other suitable processor. In some embodiments, the program code described above, the summarization neural network 110, the affect predictor neural network 130, the text document 170, and the affective text summary 180 are stored in the memory device 704, as depicted in FIG. 7. In additional or alternative embodiments, one or more of the summarization neural network 110, the affect predictor neural network 130, the text document 170, the affective text summary 180, and the program code described above are stored in one or more memory devices accessible via a data network, such as a memory device accessible via a cloud service.

The affective summarization system 701 depicted in FIG. 7 also includes at least one network interface 710. The network interface 710 includes any device or group of devices suitable for establishing a wired or wireless data connection to one or more data networks 712. Non-limiting examples of the network interface 710 include an Ethernet network adapter, a modem, and/or the like. A remote system 715 is connected to the affective summarization system 701 via network 712, and remote system 715 can perform some of the operations described herein, such as determining a target affect level. The affective summarization system 701 is able to communicate with one or more of the remote computing system 715, the user device 160, and the training data 105 using the network interface 710. Although FIG. 7 depicts the as being connected to affective summarization system 701 via the networks 712, other embodiments are possible, including the training data 105 residing as a data object in the memory 704 of affective summarization system 701.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A non-transitory computer-readable medium for generating affective summarizations of text documents, the non-transitory computer-readable medium embodying program code comprising instructions which, when executed by a processor, cause the processor to perform operations comprising:

receiving, by an affective summarization system, a summarization training dataset including an article word sequence and a summary word sequence;

receiving, from a predictor subnetwork included in the affective summarization system, a predicted affect level based on a normalized affect score of the summary word sequence;

training, by an embeddings generator included in the affective summarization system, an embeddings function based on the predicted affect level, wherein the embeddings function is trained to provide an embeddings sequence including either a vocabulary token or a one-hot vector, based on the predicted affect level and the article word sequence;

modifying the summarization training dataset by removing the article word sequence and adding the embeddings sequence; and     training a summarization subnetwork that is included in the affective summarization system to provide an affective text summary based on the modified summarization training dataset.

2. The non-transitory computer-readable medium of claim 1, the program code comprising further instructions which cause the processor to perform additional operations comprising:

receiving, by the predictor subnetwork, a predictor training dataset including a training word sequence and a training affect score;

modifying, by the predictor subnetwork, the predictor training dataset by removing the training affect score and adding a training affect level that is generated based on the training affect score; and     training, by the predictor subnetwork, a predictor function based on the modified predictor training dataset, wherein the predictor function is trained to provide the predicted affect level based on the summary word sequence.

3. The non-transitory computer-readable medium of claim 2, wherein generating the training affect level based on the training affect score comprises normalizing the training affect score.

4. The non-transitory computer-readable medium of claim 1, wherein:

the summarization subnetwork includes a encoder subnetwork and a decoder subnetwork,     the encoder subnetwork is configured to receive the modified summarization training dataset as an input, and     the decoder subnetwork is configured to receive an output of the encoder subnetwork as an additional input.

5. The non-transitory computer-readable medium of claim 4, wherein training the summarization subnetwork to provide the affective text summary includes training the encoder subnetwork to determine an affective hidden state sequence based on the embeddings sequence.

6. The non-transitory computer-readable medium of claim 4, wherein training the summarization subnetwork to provide the affective text summary includes training the decoder subnetwork to:

generate an output word based on an affective hidden state sequence received from the encoder subnetwork;

modify a partial training sequence based on the output word, wherein the modified partial training sequence includes the output word; and     generate the affective text summary based on the modified partial training sequence.

7. An affective summarization system for generating text summaries based on affective preferences, the affective summarization system comprising:

at least one processor configured to receive an affect level indicating an affective preference of a user and comprising a vocabulary token or a one-hot vector;

a non-transitory computer-readable medium implementing a summarization neural network comprising:

an embeddings generator to extract an embeddings sequence representing a combination of the affective preference and words in a text document;

an encoder subnetwork to generate an affective hidden state sequence comprising a vector representation of an encoding in the embeddings sequence; and         a decoder subnetwork to generate, from an input text document, an affective text summary comprising an output word associated with the affective hidden state sequence.

8. The affective summarization system of claim 7, further comprising a predictor subnetwork, wherein:

the embeddings generator is configured to receive the affect level from the predictor subnetwork responsive to the predictor subnetwork being applied to the text document, and     the predictor subnetwork includes a predictor function that is trained to determine a normalized affect score of a training word sequence.

9. The affective summarization system of claim 8, wherein the predictor subnetwork is configured to:

access a predictor training dataset having multiple tuples, each tuple including a training word sequence and a respective training affect score that correspond to a particular training document, and     determine, for each tuple, a respective affect bin corresponding to the respective training affect score included in the tuple,     wherein the normalized affect score is based on at least one affect bin determined for the multiple tuples.

10. The affective summarization system of claim 7, wherein the affect level is received in a matrix including multiple additional affect levels, and wherein the at least one processor is further configured to receive, for each additional affect level:

an additional embeddings sequence based on the additional affect level;

an additional affective hidden state sequence comprising an additional vector representation of the additional embeddings sequence; and     an additional affective text summary comprising an additional output word associated with the additional affective hidden state sequence.

11. The affective summarization system of claim 7, wherein the decoder subnetwork is configured to generate the affective text summary by performing operations comprising:

modifying a partial summary sequence of the input text document based on the output word, wherein the modified partial summary sequence includes the output word; and     generating the affective text summary based on the modified partial summary sequence.

12. The affective summarization system of claim 11, the summarization neural network further comprising a feedback layer providing feedback about a previous output word, wherein the decoder subnetwork determines output words based on training feedback about previous output words.

13. In a digital medium environment for providing summaries of text documents, a computer-implemented method for generating affective text summaries based on affective preferences, the method including one or more computer-implemented operations comprising:
- a step for generating an affective text summary of an input text document based on a affective hidden state sequence extracted from an embeddings sequence, the embeddings sequence representing a combination of an affective preference and words in an input text document; and
- outputting the affective text summary.

14. The method of claim 13, wherein:
- an affect level used to generate the affective text summary is received from a predictor subnetwork responsive to the predictor subnetwork being applied to the input text document, and
- the predictor subnetwork includes a predictor function that is trained to determine a normalized affect score of a training word sequence.

15. The method of claim 14, further comprising:
- training the predictor subnetwork based on a predictor training dataset having multiple tuples, each tuple including a training word sequence and a respective training affect score that correspond to a particular training document,
- wherein the predictor subnetwork is trained to determine, for each tuple, a respective affect bin corresponding to the respective training affect score included in the tuple,
- wherein the normalized affect score is based on at least one affect bin determined for the multiple tuples.

16. The method of claim 13, wherein an embeddings generator extracts the embeddings sequence based on an embeddings function, wherein the embeddings function is trained to:
- calculate a particular vocabulary token based on the input text document, and
- generate the embeddings sequence including the particular vocabulary token.

17. The method of claim 13, wherein an embeddings generator extracts the embeddings sequence based on an embeddings function, wherein the embeddings function is trained to:
- calculate a particular one-hot vector based on the input text document, and
- generate the embeddings sequence including the particular one-hot vector.

18. The method of claim 13, wherein an affect level used to generate the affective text summary is received in a vector including multiple additional affect levels, and wherein the method further comprises, for each additional affect level:
- extracting an additional embeddings sequence based on the additional affect level;
- extracting an additional affective hidden state sequence based on the additional embeddings sequence; and
- generating an additional affective text summary based on the additional affective hidden state sequence.

19. The method of claim 13, wherein generating the affective text summary further includes:
- generating, based on the affective hidden state sequence, an output word;
- modifying a partial summary sequence of the input text document based on the output word, wherein the modified partial summary sequence includes the output word; and
- generating the affective text summary based on the modified partial summary sequence.

20. The method of claim 19, further comprising receiving feedback about a previous output word, wherein the output word is based on feedback about the previous output word.

* * * * *